United States Patent [19]

Schlatter et al.

[11] Patent Number: 5,658,618
[45] Date of Patent: Aug. 19, 1997

[54] METHOD AND APPARATUS FOR TREATING THE SURFACE OF FLEXIBLE TAPE-LIKE MATERIAL WEBS

[75] Inventors: Manfred Schlatter, Freiburg; Ulrich Goltz, Oberkirch, both of Germany

[73] Assignee: BASF Magnetics GmbH, Mannheim, Germany

[21] Appl. No.: 522,260

[22] PCT Filed: Mar. 1, 1994

[86] PCT No.: PCT/EP94/00582
§ 371 Date: Sep. 8, 1995
§ 102(e) Date: Sep. 8, 1995

[87] PCT Pub. No.: WO94/20955
PCT Pub. Date: Sep. 15, 1994

[30] Foreign Application Priority Data

Mar. 10, 1993 [DE] Germany ............ 43 07 527.4

[51] Int. Cl.⁶ .................. B05D 3/12; B05C 11/00
[52] U.S. Cl. ............ 427/444; 427/130; 427/355; 118/56
[58] Field of Search .............. 118/56; 427/130, 427/444, 355

[56] References Cited

U.S. PATENT DOCUMENTS

| | | |
|---|---|---|
| 2,688,567 | 9/1954 | Franck . |
| 3,102,667 | 9/1963 | Ullevig . |
| 3,616,478 | 11/1971 | Martz et al. . |
| 4,254,585 | 3/1981 | Schoettle et al. ............ 427/130 |
| 4,331,993 | 5/1982 | Pfost et al. ............ 360/137 |
| 4,887,623 | 12/1989 | Sugiyama et al. ............ 134/64 R |
| 5,009,929 | 4/1991 | Iida et al. ............ 427/136 |
| 5,012,548 | 5/1991 | Jeffries ............ 15/308 |
| 5,077,881 | 1/1992 | Endo ............ 29/400.1 |
| 5,144,513 | 9/1992 | Gadsby et al. ............ 360/137 |
| 5,238,753 | 8/1993 | Ryoke et al. ............ 427/130 |

FOREIGN PATENT DOCUMENTS 1 349 480  4/1974  United Kingdom .

OTHER PUBLICATIONS

Abstract SU 1,675,942.
Abstract JP 4/182 929.
Abstract JP 4/184 712.
Abstract JO 2285-516.
Abstract JP 03/008 115.

Primary Examiner—Katherine A. Bareford
Attorney, Agent, or Firm—Keil & Weinkauf

[57] ABSTRACT

A method for reducing the abrasiveness of a coated product web is described, in which the product web is guided with its coated side over a deflection roller (2) and thereafter, in the course of a contact zone over guide rollers and deflection rollers or linear zones in between, is treated with itself, ie. once again with an abrasive surface. The abrasive action can be controlled in a specific manner through the relative speeds of the two surfaces, the tape tension and the length of the contact surface. Abraded particles present on the layer surface are subsequently removed by extraction.

5 Claims, 2 Drawing Sheets

METHOD AND APPARATUS FOR TREATING THE SURFACE OF FLEXIBLE TAPE-LIKE MATERIAL WEBS

This is a national stage application of PCT/EP94/00582, filed Mar. 1, 1994.

BACKGROUND OF THE INVENTION

1. Field of the Invention

The present invention relates to a method of surface treatment for reducing the abrasiveness of flexible tape-like material webs which are provided on at least one side with a coating which contains abrasive particles, the coated side of the material web being brought into frictional contact with the coated side of the deflected material web while running in the opposite direction thereto and particles present on the coated side of the material web subsequently being removed, and to an apparatus for carrying out the method for surface treatment.

2. Description of the Related Art

A number of apparatuses and/or methods are known in which the surface of flexible tape-like material webs, for example of magnetic recording media and in particular video tapes, are treated. The primary aims of this surface treatment are removing small particles from the web surface to reduce the dropout rate reducing the magnetic head abrasion since particularly magnetic recording media may have particles projecting from the surface, for example magnetizable particles or nonmagnetic inorganic or organic particles, which have an abrasive effect, with the result that the magnetic heads for recording and playback of magnetic recordings rapidly become worn. This plays a particular role in duplication, when large amounts of magnetic recording media are provided with magnetic recordings at high speed.

In the TMD process in which, during contact copying with a master tape, a magnetic recording medium is heated to the Curie point of the magnetizable particles, it is also necessary for the abrasive behavior of the magnetic layer to be minimized, most materials of this type containing hard $CrO_2$ pigments as magnetizable particles.

Methods and apparatuses for the surface treatment are disclosed, for example, in DE 28 03 914, DE 38 00 196, DE 38 12 851 and Japanese Applications 04/182929, 04/184712, 38115 (1991) and 02/285516 and U.S. Pat. No. 5,012,548. According to the abovementioned documents, either the layer surface of the material web is brought into contact with a special abrasive tape, which is moved at a defined contact pressure in the opposite direction to the tape, or the layer is passed over rotating cylindrical rollers having a defined roughness, or the layer is moved over a cylindrical roller which has hard edges and also rotates. A possible disadvantage of the abovementioned arrangements is that the surface of the abrasive tape or of the abrasive cylinders changes during continuous operation, so that the abrasive effect changes after a certain time and a uniform effect therefore cannot be achieved.

DE 38 00 197 discloses a method for the surface treatment of substrate sheets, in which the latter are faced and then finely processed with lapping wheels with the addition of a polishing liquid comprising an aqueous solution containing alumina powder and organic additives, the lapping wheels being provided with a covering of a resilient material.

Arrangements for reducing the abrasiveness of coated material webs, in which the layer side is passed over a sharp edge, are also known. Such arrangements are described in DE 21 19 094, DE 32 11 226, DE-A 42 20 880 and Japanese Application 03/288326. According to U.S. Pat. No. 3,616,478, a magnetic tape passes over a blade which consists of a crystalline ceramic material and which should make a certain angle with the magnetic tape. U.S. Pat. No. 3,674,579 describes a method in which the layer side of the tape to be cleaned passes over the parallel edges of a continuous steel belt which is clamped between two rollers, one of which is driven by a motor.

These apparatuses have the disadvantage that, in the case of a broad material tape, expensive measures have to be taken in order to remove particles adhering to the blades, for example by air extraction. This disadvantage can be partly overcome if the material strips which are respectively cut to the width for use are first passed over the blades. However, very expensive apparatus is then required. However, both cases have the fundamental disadvantage that, after a certain time, the blades have worn out and must be replaced.

Methods and apparatuses for removing small particles present on the layer, for example by extraction, wiping off or separation or by electrostatic means, are described in the publications U.S. Pat. No. 5,144,513, SU 1 675 942, U.S. Pat. Nos. 3,102,667, 5,077,881 and 4,887,623.

A method frequently used for the surface treatment of flexible tape-like material webs is calendering, in which coated plastic films are drawn through two rotating calender rolls which press against one another under defined pressure and at a defined temperature. Calendering is usually carried out in the longitudinal direction of the film web. Investigations by the Applicant have shown that the abrasiveness of the coating cannot be satisfactorily reduced by calendering alone.

A method of the generic type stated at the outset is described in U.S. Pat. No. 2,688,567, in which the coated sides of a magnetic recording medium are transported past one another in opposite directions with linear contact between two movable pressure rollers in order to be calendered in this manner. According to the statements in this publication, calendering is presumably achieved by pressing the abrasive particles into the plastically deformable layer. Furthermore, linear contact is scarcely likely to be suitable for reducing the abrasiveness in a defined manner.

It is an object of the present invention to provide a method for treating the surfaces of tape-like material webs which does not have the disadvantages of the abovementioned prior art, which can be carried out reproducibly and cheaply and in which the abrasiveness of the layer is markedly reduced.

We have found that this object is achieved by a method and apparatus for carrying out the method in which the abrasive coated surface is treated with itself by passing the tape in such a way that the surfaces come into frictional contact with one another over a given length.

BRIEF DESCRIPTION OF THE DRAWINGS

FIG. 3 shows a schematic representation of an apparatus similar to FIG. 2, with the contact roller of the material webs swiveled in.

DESCRIPTION OF THE PREFERRED EMBODIMENTS

The essential feature of the novel method is that the abrasive coated surface of the material web is treated with itself, ie. once again with a coated abrasive surface, by passing the web in the apparatus in such a way that, under predetermined conditions, the surfaces touch one another or come into frictional contact with one another over a certain length. The web movement is in opposite directions in the contact zone so that the resulting speed of the two surfaces relative to one another is twice the web speed. The treatment takes place simultaneously on the two surfaces: first, the surface which has been unwound last and is still untreated comes into contact with a previously treated surface which then itself becomes the surface treated once and, after deflection, comes into contact with a new surface not yet treated. Each of the two surfaces thus treats the other, actually resulting in a marked reduction in the abrasiveness, as is evident from the examples below. The dust formed in the frictional treatment is also extracted in an effective manner by suitable additional means which are described further below, with the result that the number of particles present on the surface is reduced to a minimum.

The novel method is illustrated below with reference to the example of the surface treatment of the magnetic layer of a magnetic recording medium, but without restricting the invention to this application.

Figure 1:
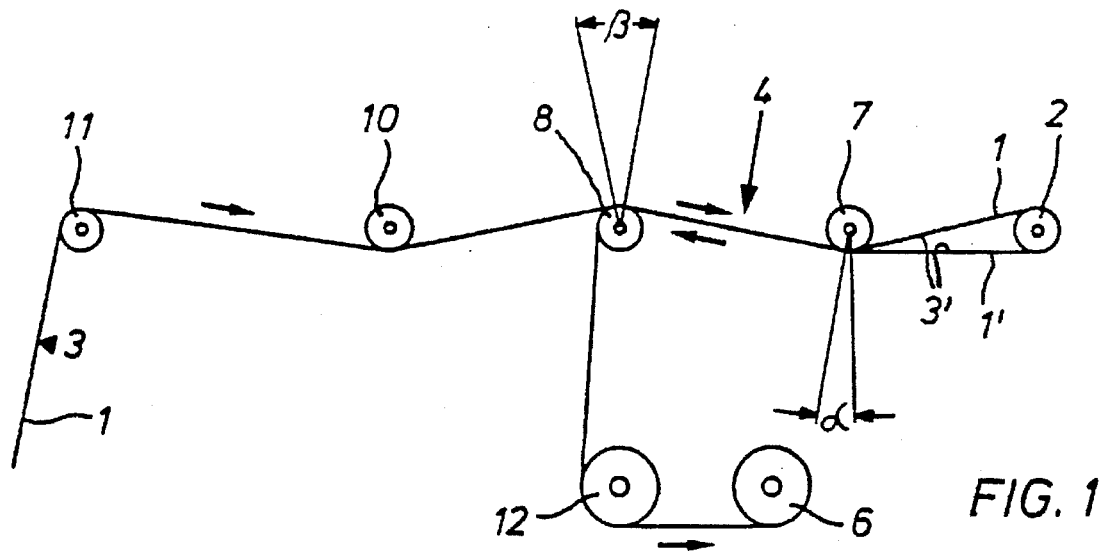
FIG. 1 shows a schematic representation of an apparatus for carrying out the novel method.

An apparatus for carrying out the method for surface treatment is shown schematically in FIG. 1. The material web (1) consists of a polyethylene terephthalate substrate which may have a thickness of 5–200 μm. A magnetic coating (3) whose composition will be described subsequently with reference to examples and which generally has a layer thickness of 1–30 μm is applied to one side. The magnetic coating contains mainly magnetizable finely divided pigments, for example $CrO_2$, $\gamma$-$Fe_2O_3$, $Fe_3O_4$, metal powder, alloys or mixtures thereof. The pigments are dispersed in a polymeric binder, such as polyurethane, vinyl polymers or others, which is soluble in an organic solvent; furthermore, the coating composition may contain further additives, such as nonmagnetic abrasive particles consisting of finely divided inorganic or organic pigments, and wetting agents, lubricants and hardening agents and others. Examples of magnetic coatings are mentioned further below.

After the coating and subsequent drying and, if required, calendering, the material web runs, in the direction indicated by the arrow, over guide rollers (11, 10, 8, 7) and subsequently over a deflection roller (2) which passes the web back to its initial direction. The arriving (1) and the returned web (1') then pass together over the contact zone (4), between the guide rollers (7, 8) and along the wrap zone of the rollers (7, 8), the roller (8) simultaneously being a deflection roller for the returned web (1'). In the zone (4), the material web (1, 1') with the still untreated coating (3) or the layer (3') ground against itself can be subjected on both sides to pressure from contact pressure apparatuses (not shown) under defined conditions. Thereafter, the material web treated in this manner passes over the guide rollers (8, 12) to a winding means (6) for further processing or to a cutting apparatus for longitudinal slitting into the required widths for use. With the novel method, it is of course also possible to cut the material web into individual strips before passage through the surface treatment zone just mentioned and then to treat each individual strip in the manner described and subsequently to wind said strip.

Figure 2:
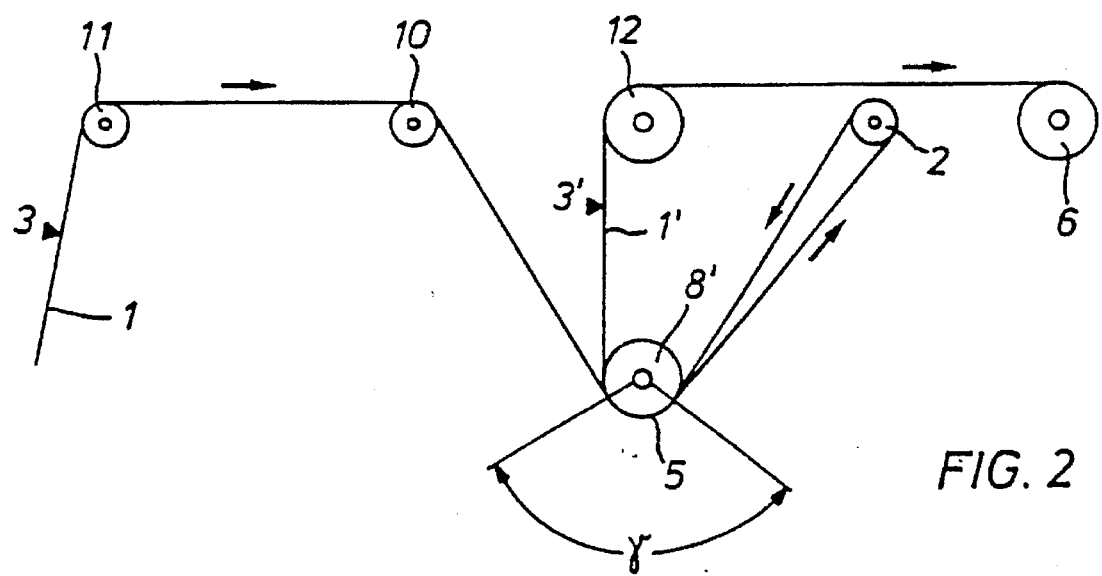
FIG. 2 shows a further apparatus.

A modified apparatus is shown in FIG. 2. In this, the back of the material web (1) first passes over deflection rollers (10, 11), after which the layer side (3) of said web passes over the contact zone (5) during passage over a part of the circumference of this guide roller, before and after the direction-change operation by the deflection roller (2), only during passage of the guide roller and deflection roller (8'). The further course of the material web (1') with the treated coating (3') is as described with reference to FIG. 1.

The contact zones (4, 5) and the contact pressure of the two surfaces (3, 3') against one another in the apparatuses according to FIGS. 1 and 2 are achieved by the length of the zone (4) and, as shown in both figures, by a suitable choice of the deflection angle ($\alpha$, $\beta$, $\gamma$) at the guide rollers and deflection rollers (7, 8, 8') and by suitably setting the web tension before and after the novel apparatus. The angles ($\alpha$, $\beta$, $\gamma$) may be from greater than 0 to less than 180° and, if required and permitted by the geometric conditions, even greater than 180°. The angle $\gamma$ at the deflection roller (8') is preferably moved about 40°.

The length of the contact zone is from 2 to 60 mm, particularly preferably 4–25 mm. As already mentioned, the contact pressure is set via the tape tension, the latter being 0.05–0.20, particularly preferably 0.1, N/mm of tape width.

The diameters of the deflection and guide rollers can themselves be chosen within wide limits, preferably 10–50 mm.

Of course, installation of the novel apparatus in other components involved in the treatment process for the material web, for example in the coating apparatus or in the calender, is also possible.

Figure 3:
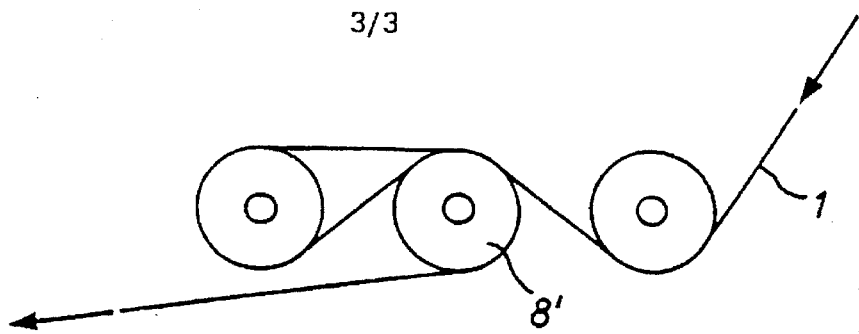
Figure 4:
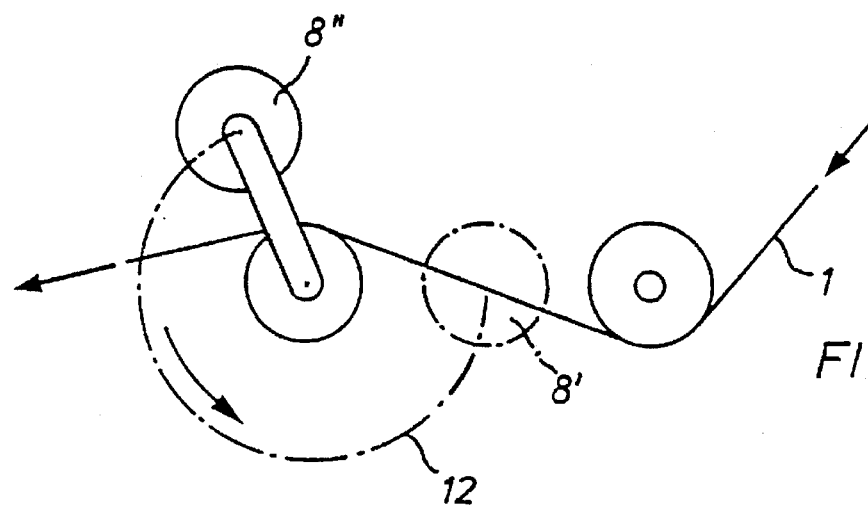
FIG. 4 shows a schematic representation similar to FIG. 3 but with the contact roller swiveled out and FIG. 5 shows a schematic representation similar to FIG. 3 but with the cleaning roller swiveled forward and with an extraction apparatus.

The particular conditions during threading of the material web or during a web change, ie. the passage of an adhesive point at the connection point between two material webs, will now be described in a simplified schematic representation with reference to FIGS. 3 and 4. Here, the contact roller (8') can be swiveled outward. When an adhesive point approaches or passes through, the roller (8') is swiveled outward (8") along a circle (12) by means of a suitable guide, so that the material web (1) in this case, as shown in FIG. 4, does not undergo any surface treatment, whereas, when the contact roller (8') is swiveled in, as shown in FIG. 3, said web is subjected to the treatment process described above during the wrap of the roller (8').

Figure 5:
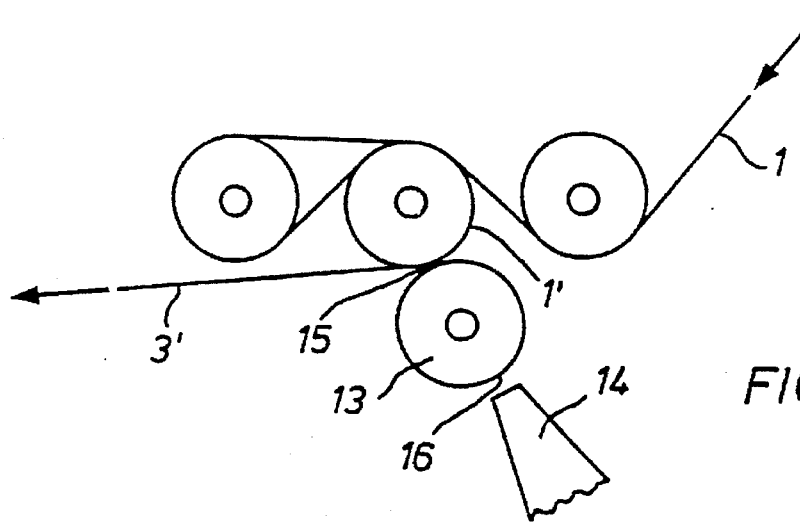

Since dust-like residues are formed in the described treatment of the surface of the magnetic layer, the novel apparatus contains a cleaning unit which is intended primarily not for the cleaning of a material web generally but especially for the cleaning of the web treated by the apparatus, ie. is engaged only in this case. This is evident from FIG. 5. The cleaning unit consists, for example, of a roll (13) which is covered with fleece, velour, velvet or a similar dust-absorbing material or around which such a material, which is then web-like, is wrapped. At the point (16) opposite the cleaning point (15), the adhering dust is removed again from the covering by an extraction apparatus (14), for example by means of a slot-type nozzle. In another possible method, the cleaning roller (13) has a tacky covering which picks up the particles present on the coating side (3'). In this case, the extraction apparatus (14) can be omitted.

EXAMPLE 1

4,500 g of tetrahydrofuran as a solvent, 912 g of a 50% strength solution of a polyurethaneurea having an OH number of 55, 126 g of a 50% strength solution of a polyurethaneurea acrylate, 510 g of a 20% strength solution of a polyvinylformal, 1,800 g of a ferromagnetic chromium dioxide having a coercive force of 56 kA/m, an average needle length of 0.24 µm and a BET surface area of 33 m²/g, 1,200 g of γ-Fe₂O₃ (Co-doped, $H_c$=63 kA/m, BET =40 m²/g), 30 g of zinc oleate, 15 g of stearic acid and 30 g of methyl stearate were introduced into a stirred ball mill having a capacity of 1.5 parts by volume and containing 2.7 kg of ceramic balls having a diameter of from 0.7 to 1.5 mm, and the dispersion was very finely milled for 12 hours. The magnetic dispersion was then filtered under pressure and, immediately before application to a 15 µm thick polyethylene terephthalate substrate, was provided with 0.04 part, based in each case on 1 part of dispersion, of a 50% strength solution of a triisocyanate, while stirring. The material web coated so that the resulting dry thickness was 3 µm was passed through a magnetic field to orient the magnetic pigments and then dried at from 50° to 80° C. and calendered by being passed between heated rollers under a nip pressure of 200 kg/cm. Thereafter, the material web was passed through an apparatus according to FIG. 2, the angle of deflection γ on passage through the guide roller (8') being 40°, which corresponds to a contact length of about 14 mm. The width of the material web was 660 mm, the web tension was 48 N and the web speed was 180 m/min. The material web was then slit into ½" (12.45 mm) wide strips and assembled in VHS video cassettes.

COMPARATIVE EXAMPLE 1

The procedure was as in Example 1, except that, after calendering, the material web was passed through a blade cleaning zone as described in FIG. 2 of the abovementioned Application P 42 20 860.

The residual abrasiveness of the slit magnetic recording media which had been produced according to the example and comparative example was measured.

Various methods for measuring the abrasiveness are discussed in detail in the monograph by F. Jorgensen "The complete Handbook of Magnetic Recording", 3rd Edition, pages 427–437. The following procedure was adopted in the present case.

522 m of each of the two tapes slit in this manner were drawn under a web tension of 0.4N, at a rate of 62 m/min over the 90° edge of a ferrite cube from Sumitomo, with the designation HYR 2 B, at a deflection angle of 20° (corresponding to an angle of wrap of 160°), with the layer side facing said edge. The volume of the ferrite wedge ground off by 1 m tape length was measured in µm³.

The tape produced according to Example 1 had a residual abrasiveness of only 6.9 µm³, whereas the tape treated according to Comparative Example 1 had a residual abrasiveness of 18.3 µm³. The dropout rates of the tapes according to Example 1 and Comparative Example 1, which were measured by conventional methods, were virtually identical.

EXAMPLE 2

| A dispersion having the composition | parts by weight |
| --- | --- |
| Co-doped iron powder (BET = 58 m²/g, $_iH_c$ = 125 kA/m) | 60 |
| Vinyl chloride copolymer | 9 |
| Polycarbonate/polyurethane | 9 |
| Carboxylic acid-containing polyalkylene oxide acrylate | 4 |
| α-Al₂O₃ | 7 |
| Lubricant | 2 |
| Dispersant | 2 |
| Diisocyanate | 2 |
| Tetrahydrofuran | 250 | was prepared as described in Example 1. The viscosity of the dispersion was 1450 mPa·s.

This dispersion was applied to a 15 µm thick polyethyleneterephthalate substrate to give a layer which was 2 µm thick when dry. Further treatment was effected as in Example 1. The web was then slit longitudinally into 8 mm wide strips and assembled in 8 mm video cassettes.

Comparative Example 2

The procedure was as in Example 2, but no subsequent surface treatment according to the present invention was carried out after calendering.

The abrasiveness of the two tapes was then measured in the same way as with the samples according to Example 1 and Comparative Example 1.

The material produced according to Example 2 had an abrasiveness of 10 µm³ whereas that produced according to Comparative Example 2 had an abrasiveness of 30 µm³.

We claim:

1. A method of reducing abrasiveness of a surface of a flexible tape coated with a polymeric binder containing abrasive particles, which process comprises: passing the coated surface (3a) of the tape in frictional contact in a contact zone with the coated surface (3') of a portion of the tape which has passed over a deflection roller and is running in the opposite direction of the coated surface (3a) of the tape, said contact zone comprising two deflection rollers (7,8) and a linear section in between having a length of from 2–60 mm, and said tape having a tape tension of 0.05 to 0.20 N/mm of tape width.

2. A method as defined in claim 1, wherein the angle of wrap (α, β, γ) of the deflection rollers (7, 8, 8') is from greater than 0 to less than 180°.

3. A method as defined in claim 1, wherein particles present on the layer side (3') of the treated product web are subsequently removed in the contact zone by a swivelable cleaning roller (13) and an extraction apparatus (14).

4. Apparatus for treating a surface of flexible tape to remove abrasive particles from said surface which comprises guide rollers (11, 10, 8, 8', 7, 12) for guiding a tape, a deflection roller (2) for reversing the direction of the tape and a wrap-around roller (8', 8") which can be swiveled in and out along the tape path and serves for common guidance of the arriving and departing tape (1,1') and a following cleaning roller (13) which can be applied to a layer side (3') of the tape.

5. Apparatus as defined in claim 4, wherein a point (15) of application of the cleaning roller (13) on the tape (1') is located at a point where the tape leaves the wrap-around roller, and wherein is adjacent to the cleaning roller and an extraction apparatus (14) opposite the point (15) of application of the cleaning roller.

\* \* \* \* \*